United States Patent [19]

Aruga et al.

[11] Patent Number: 4,778,507
[45] Date of Patent: Oct. 18, 1988

[54] METHOD FOR BENDING GLASS PLATES

[75] Inventors: Chikao Aruga, Yokohama; Yoshio Koga; Toshihiko Waki, both of Toyoda, all of Japan

[73] Assignee: Asahi Glass Company Ltd., Tokyo, Japan

[21] Appl. No.: 83,974

[22] Filed: Aug. 11, 1987

[30] Foreign Application Priority Data

Aug. 12, 1986 [JP] Japan .................................. 61-187873

[51] Int. Cl.⁴ ............................................ C03B 23/03
[52] U.S. Cl. ........................................ 65/106; 65/107; 65/273; 65/289; 65/290
[58] Field of Search .................. 65/106, 107, 273, 289, 65/290

[56] References Cited

U.S. PATENT DOCUMENTS 4,260,040  4/1981  Reese et al. ............................ 65/106
4,609,391  9/1986  McMaster ............................... 65/106

Primary Examiner—Arthur Kellogg
Attorney, Agent, or Firm—Oblon, Fisher, Spivak, McClelland & Maier

[57] ABSTRACT

A method for bending glass plates comprises a step of softening by heating at least two glass plates placed in an overlapping state on a bending ring mold to shape them in a curved form by their own deadweight in a processing zone of a heating oven, a step of pressing the at least two overlapped glass plates from the top, which are bent or being bent in a predetermined form by their deadweight on the bending ring mold, by a pressing mold in a pressing zone in the heating oven or in the pressing zone under heating condition which is connected to the heating oven, and a step of gradually cooling the at least two glass plates in a cooling zone outside the heating oven.

2 Claims, 4 Drawing Sheets

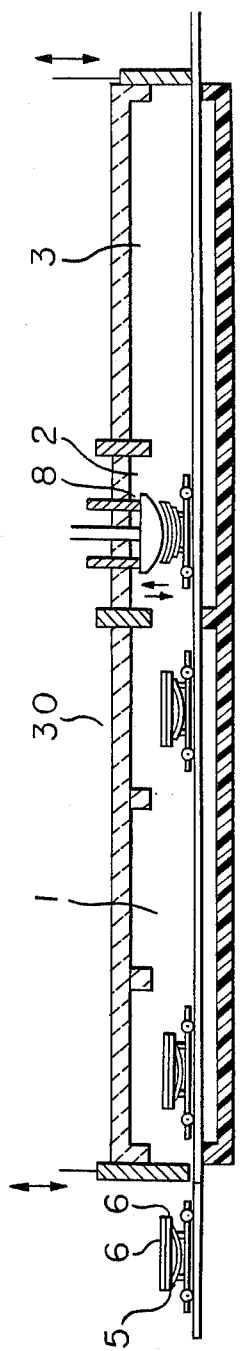

METHOD FOR BENDING GLASS PLATES

BACKGROUND OF THE INVENTION

1. Field of the Invention

The present invention relates to a method for bending at least two glass plates as element materials to form a curved laminated glass. More particularly, it relates to a method for bending a laminated glass consisting of at least two glass plates to have them possess three-dimensional curved surfaces.

2. Discussion of Background

A laminated glass prepared by laminating two sheets of glass between which an intermediate film such as a polyvinyl butyral film is interposed, followed by bonding them, is widely used for a windshield glass or a rear window glass for automobiles and other vehicles because it is highly safe. Generally, a laminated glass in a curved form is used for the windshield glass for the automobiles from the viewpoint of design of the automobiles.

There have been such problem that when the curved laminated glass is to be prepared and if the radius of curvatures at the mating surface of two glass plates to be laminated do not entirely or partially coincide with each other, either or both the glass plates may be broken at a compressing step; undesired air bubbles may be produced between the mating surfaces for long time use, or the mating surfaces may be separated. Accordingly, when the laminated glass having a curved surface is manufactured, it is necessary to coincide the radius of curvature of each of the two glass plates. From this viewpoint, it is desirable that two overlapped glass plates are simultaneously subjected to a bending operation. When such operation is carried out, it is necessary to prevent the two glass plates from being in contact with each other. For this purpose, powder of a material such as sodium bicarbonate, sellaite and so on is generally provided between the mating surfaces.

When glass plates are bent together into a shallow-bent shape wherein the radius of curvature R of the curved portion is 20,000 mm or greater, the shallow-bent portion can be easily obtained, as originally designed, by using a deadweight bending method. However, when the laminated glass is deeply bent wherein the radius of curvature R of the glass plate is 20,000 mm or smaller; especially the glass is subjected to a deep-bending method to have a three-dimensional curved surface wherein the radius is 10,000 mm or smaller, it is necessary to elevate temperature at the surface of the glass plate to be 630° C. or higher. If two glass plates are subjected to the deep-bending method, the powder such as sodium bicarbonate, sellaite and so on provided between the two glass plates or cullet may bit in the mating surface to thereby cause optical distortion to a glass product.

On the other hand, although the technique that glass plates are bent by pressing them has been well-known, it has been applied mainly to manufacture curved tempered glass plates.

A technique that a laminated glass is bent by using a pressing machine is disclosed, for instance, in Japanese Unexamined Patent Publication Nos. 120524/1981 and 129214/1978.

Of these prior art techniques, Japanese Unexamined Patent Publication No. 120524/1981 discloses that a glass plate softened by heating is pressed by upper and lower pressing molds to be bent in a predetermined shape. In this method, a predetermined final shape can not be obtained with high accuracy, and the construction of the pressing machine becomes complicated.

Japanese Unexamined Patent Publication No. 129214/1978 discloses that a glass plate is bent by controlling the temperature of a heating source which is disposed above the glass plate. In this method, the surface temperature of the glass plate becomes high with the result that there causes reduction in optical characteristics which is undesired for a laminated glass.

SUMMARY OF THE INVENTION

It is an object of the present invention to provide a method for bending at least two glass plates to manufacture a laminated glass having a curved convex surface.

Particularly, it is an object of the present invention to provide a method for bending a laminated glass plate consisting of at least two glass plates into a three-dimensional curved shape by using a pressing machine which presses the glass plates only from the top in a heating oven or a chamber which gives a condition similar to the heating oven without necessitating elevation of temperature to such extent that the surface temperature of the glass plate adapts to the temperature of a bending ring mold when the overlapped two glass plates are subjected to a bending operation.

The foregoing and the other objects of the present invention have been attained by providing a method for bending glass plates which comprises a step of softening by heating at least two glass plates placed in an overlapping state on a bending ring mold to shape them in a curved form by their own deadweight (this is referred to as a bending or sagging method by gravitation) in a processing zone of a heating oven, a step of pressing said at least two overlapped glass plates from the top, which are bent or being bent in a predetermined form by their deadweight on said bending ring mold, by a pressing mold in a pressing zone in said heating oven or in said pressing zone under heating condition which is connected to said heating oven, and a step of gradually cooling said at least two glass plates in a cooling zone outside said heating oven.

In the preferred embodiment of the present invention, the glass plates, which are bent by its deadweight of the bending ring mold, are pressed from the top of the glass plates by using a pressing mold having a curvature in the shaping surface which is greater than a curvature in the shaping surface of the bending ring mold.

In the preferred embodiment of the present invention, the overlapped glass plates which are bent by its deadweight on the bending ring mold are further pressed from the top of the glass plate by using a pressing mold having a curvature in the shaping surface greater than that of the shaping surface of the bending ring mold in such a manner that the peripheral portion of the pressing mold does not contact with a peripheral portion of the glass plates on the bending ring mold.

In the preferred embodiment of the present invention, the glass plates, which are bent by its deadweight on the bending ring mold are pressed from the top of the glass plates by using a pressing mold having an inner dimension of the shaping surface which is smaller than that of the shaping surface of the bending ring mold in such a manner that the pressing mold does not contact with a peripheral portion of the glass plates on the bending ring mold.

The present invention is to bend a plurality of glass plates, usually two glass plates, by their deadweight into a predetermined shape. In this case, it is preferable that in order to obtain a final shape having a three-dimensional surface by bending operations, a bending operation is first carried out to portions of the glass plates having a larger radius of curvature to some extent or to the extent of the substantially final stage. Then, bending operations to the portions of the glass plates having a smaller radius of curvature in the final shape of the three-dimensional curved surface, are carried out by pressing them from the top by using a pressing mold.

When the glass plates, which are bent or being bent by their deadweight on the bending ring mold, are pressed by using a pressing mold from the top of the glass plates into a predetermined final shape, there is possibility of occurrence of undesired deformation of the glass plates at their lower portion. To avoid such deformation, a supporting member may be provided at a suitable position so as to support the glass plate from the lower part.

The bending ring mold used for the present invention is of a ring-frame type or a skeleton framework type as shown in FIG. 2 which is adapted to support the glass plates at their peripheral portion, and has a glass plate supporting surface to give a predetermined shaping surface of the glass plates to be bent. Since a laminated glass used for a typical windshield window for automobiles is formed to have both sides having a larger radius of curvature than the central portion, the ring-frame of the bending ring mold comprises a main body 15 having a predetermined shaping surface as a supporting surface which supports the central portion of the glass plates and side portions 16 at both sides of the main body 15 which respectively have predetermined shaping surfaces as supporting surfaces for supporting both side portions of the glass plates. The main body 15 and the side portions 16 of the bending ring mold are swingably supported by means of hinges 27 at their neighboring parts. Accordingly, when the side portions 16 are raised, both the supporting shaping surfaces of the main body 15 and the side portions 16 define a predetermined final shape of the glass plates. Generally, the bending ring mold is made of heat-resistant stainless steel, and the width of the glass plate supporting surface of the main body 15 or the side portions 16 is about 2 mm–10 mm.

In the present invention, a pressing zone may be provided in the heating oven, or outside the heating oven. In the latter case, the pressing zone may be provided at a position continuously connected to the heating oven or in the vicinity of the oven. The pressing zone is preferably maintained at the temperature in the range of from 550° C.–650° C. which is suitable for shaping by pressing the glass plates.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a diagram in longitudinally cross-sectioned of an apparatus for conducting the method of the present invention.

DESCRIPTION OF THE PREFERRED EMBODIMENTS

Figure 1:
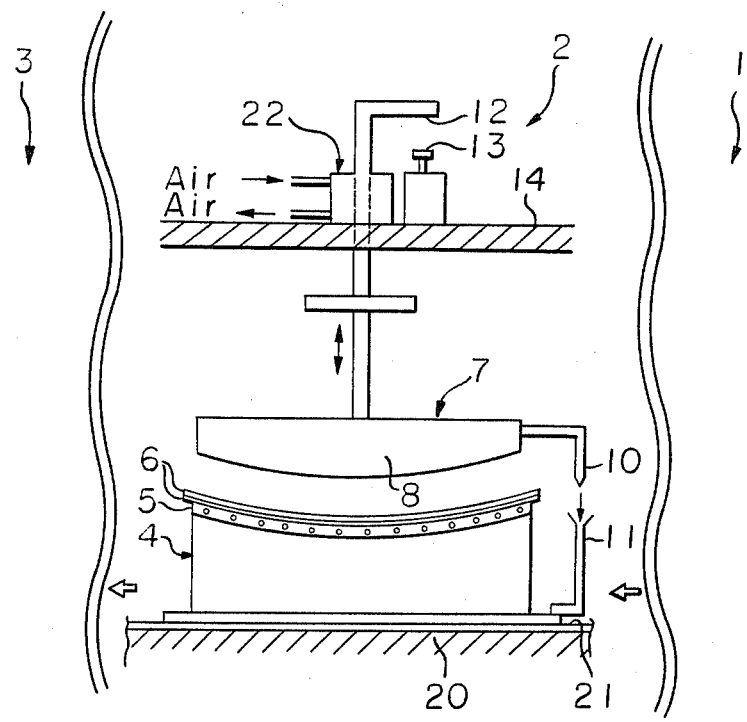
FIG. 1 is a diagram of an embodiment of a pressing machine placed in a pressing zone, which is used for conducting the method of the present invention.

Referring now to the drawings, wherein like reference numerals designate the same or corresponding parts throughout the several views and more particularly to FIGS. 1 and 9 thereof, there are shown a diagram and a side view which respectively show schematically the entire construction of an apparatus used in a pressing zone 2 located between a processing zone 1 for bending glass plates by their deadweight and a cooling zone 3, which are used for carrying out the method of the present invention.

The processing zone 1 for bending the glass plate is provided in a heating oven 30 and it constitutes a region in which two glass plates 6, 6 supported by the peripheral portion of a bending ring mold 5 of a bending ring mold device 4 are softened by application of heat, whereby the softened glass plates are bent by their deadweight so as to meet a predetermined curved shaping surface of the bending ring mold 5. After the two glass plates 6, 6 have been bent or have been subjected to bending operations by their deadweight in the processing zone 1, the bending ring mold device 4 on which the two glass plates 6, 6 are supported by the peripheral portion of the device is put on a suitable transferring means 21 such as a transferring conveyor provided on a furnace bed 20. Then the glass plates 6, 6 is transferred into a press-bending zone 2.

As soon as the bending ring mold device 4 is stopped at a given position in the press-bending zone 2, a press mold device 7 with a driving unit 22 such as an air cylinder as shown in FIG. 1, or a hydraulic cylinder or an electric motor to control ascending or descending operations of a press mold 8 is operated to descend the press mold 8. The press mold 8 may be constituted by a metal substrate such as iron, stainless steel, an alloy such as Inconel, Monel and a ceramic material. Among these materials, a stainless steel series material is preferably used from the viewpoint of its having heat resistance properties and requirement for finishing the surface of the press mold 8 to be a mirror-like surface. Further, it is desirable that the surface of the press mold 8 is covered by cloth having heat resistance properties such as cloth made of glass fibers, quartz fibers, stainless-steel fibers and so on.

Figure 5:
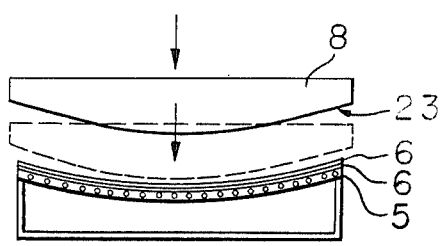
FIGS. 5–8 are respectively longitudinal cross-sectional views showing a curved convex shape at the central part of the glass plate.

The press mold 8 as a part of the press mold device 7 may have a surface area greater than that of the glass plate 6 so as not to cause distortion in the glass plates 6 by a strong pushing force given by the peripheral portion of the press mold 8 when the glass plates 6 are press-molded. The shaping surface of the press mold 8 of the press mold device 7 should be formed to obtain a predetermined final shape of curved surface by press-molding, and the shaping surface of the press mold 8 should not be directly in contact with the peripheral portion of the glass plate 6 mounted on the bending ring mold 5 when the glass plates 6 are press-molded. For this, it is desirable that the shaping surface of the press mold 8 has a relatively deep-curved surface so that a predetermined curved convex surface is formed by the pressing operation, or the shaping surface of the press mold which is in contact with the upper glass plate is made smaller than the inner dimension of the bending ring mold, or the shaping surface of the press mold 8 is so formed that it comes to contact with the central region and the region near the peripheral portion (except for the peripheral portion of the upper glass plate) of the upper glass plate 6 so that it presses the glass plates 6 from the top. A preferred example is shown in FIG. 5 in which a press mold 8 having a shaping surface 23 of a curved convex surface whose radius of curvature is slightly smaller than that of the shaping surface of the bending ring mold 5, is used.

Figure 6:
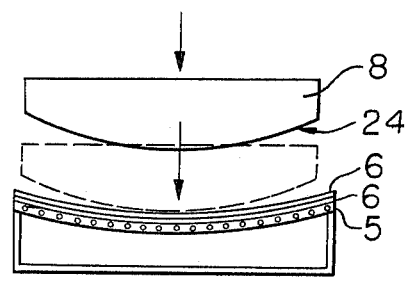

The press mold 8 is also so formed as shown in FIG. 6 that the shaping surface 24 of the press mold 8 has a curved convex surface whose radius of curvature is slightly smaller than that of the shaping surface constituted by the bending ring mold 5, and the shaping surface 24 has a smaller surface area than that of the shaping surface of the bending ring mold so that it comes to contact with the surface portion inside the peripheral portion of the glass plate when the glass plates are press-molded.

Figure 7:
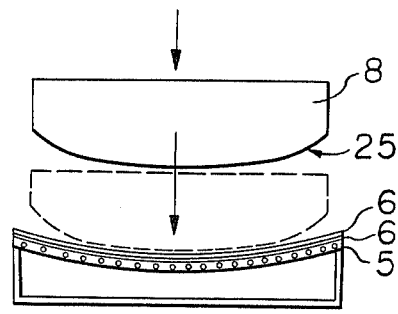

The press mold 8 is also so formed as shown in FIG. 7 that the shaping surface has a portion 25 whose radius of curvature is smaller than that of any part of the shaping surface constituted by the bending ring mold. For instance, the shaping surface at and around the central portion of the press mold 8, which comes to contact with the central portion of the upper glass plate has substantially the same radius of curvature as the shaping surface constituted by the bending ring mold, and the shaping surface at the peripheral portion of the press mold has a radius of curvature smaller than that of the shaping surface constituted by the bending ring mold.

When the shaping surface of the press mold has a radius of curvature larger than that of the shaping surface constituted by the bending ring mold, the portion having the larger radius of curvature may be located at the central portion of the shaping surface of the press mold, or may be at a position deflected from the central portion. In any way, the portion having the radius of curvature, the surface area and the radius of curvature are so determined that glass plates having a predetermined shape can be obtained.

Figure 8:
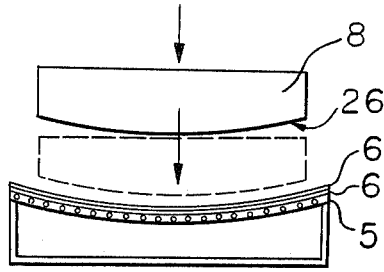

The press mold 8 may also be formed in such a manner that the shaping surface 26 of a curved convex form has a radius of curvature substantially the same as that of the shaping surface constituted by the bending ring mold 5 as shown in FIG. 8, wherein the shaping surface 26 is smaller in size than the inner dimension of the bending ring mold so that the shaping surface 26 does not contact with the peripheral portion of the upper glass plate 6, which is in contact with the shaping surface of the bending ring mold, but is in contact with the surface inside of the upper glass plate 6.

According to the present invention, the glass plates are bent by their deadweight and then are press-molded by a press mold from the top of the glass plates to thereby obtain a final product. Accordingly, the shaping surface of the press mold is preferably formed to have a curved surface in correspondence with the shaping surface of the final product of the glass plate, or to have a curved surface which gives a final product of the glass plate having a surface as previously designed.

The shape of the shaping surface of the press mold is not limited to the shape as described above, and a suitable shape of the shaping surface may be determined to obtain a desired final product of the glass plates.

Thus, by forming the press mold 8 to have a spherical shape whose radius of curvature is smaller than that in the shaping surface constituted by the bending ring mold 5, contact of the shaping surface of the press mold 8 to a portion where a ceramic coating is applied can be avoided even though the ceramic coating for coloring the peripheral portion of the glass plate 6 is applied. As a result, it is possible to press-mold the glass plates 6 without leaving a trace of press molding on the portion with the ceramic coating.

In consideration of the shape of the glass plates and utility of the glass plates as a windshield glass for automobiles, the speed of descend the press mold 8 in the press mold device 7 is preferably in the range of from 0.1 mm/sec.–10 mm/sec., more preferably, 0.3 mm/sec.–3 mm/sec.

Figure 3:
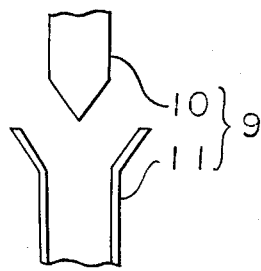
FIG. 3 is a diagram showing an embodiment of a positioning means which determines a relative position of a pressing mold to the bending ring mold.

Descending operations for the press mold 8 can be controlled by a positioning means 9 which comprises a male mold member 10 previously attached to the press mold 8 and a female mold member 11 attached to the bending ring mold device 4. Namley, as shown in FIG. 3 which shows the construction of the positioning means 9 in detail, the male mold member 10 at the press mold side is positioned to be movable in the vertical direction to the female mold member 11 at the bending ring mold side so that these members are connectable and disconnectable. Accordingly, there is no deviation in position of the press mold 8 in the horizontal direction. The positional relation between the male and female mold members 10, 11 may be upset only as far as the same function can be obtained. It is possible to use another suitable positioning means.

Figure 2:
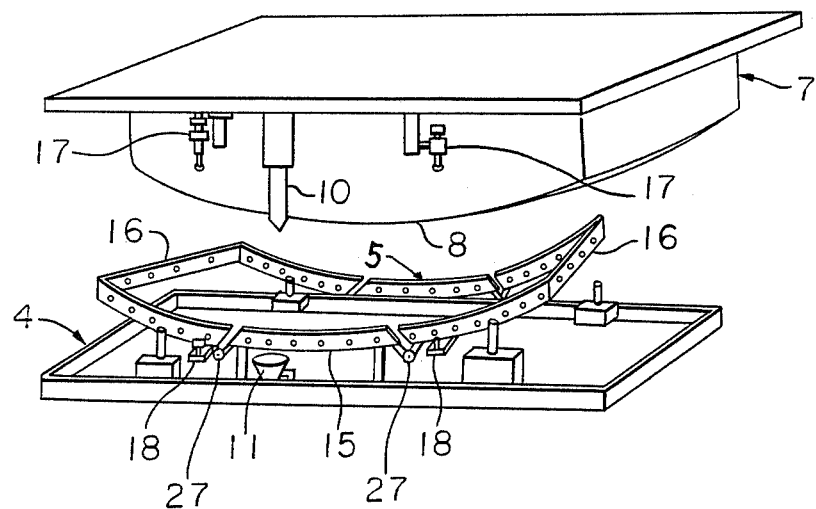
FIG. 2 is a perspective view of an embodiment of a press mold device and a bending ring mold device which are used for conducting the method of the present invention.
Figure 4:
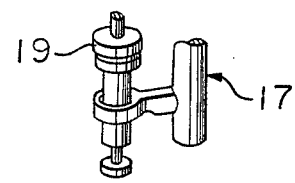
FIG. 4 is an enlarged perspective view of an embodiment of the side pushing member.

On the other hand, a travelling distance of the press mold 8 can be determined as desired by adjusting the distance between the stopper member 12 formed in the press mold device 7 and a supporting member 13 provided on a furnace top 14 which is engageable with the stopper member 12. The bending ring mold 5 for supporting the glass plates 6 may be provided with hinges 2 which oscillatably support side portions 16 at the both sides of the main body 15 as shown in FIG. 2. In such construction, the side portions 16 may be jumped up when the glass plates 6 are press-molded by the press mold 8. In order to prevent such undesirable jumping of the side portions 16, side pushing members 17 may be provided at desired positions on the press mold 8 functions as a pressing device to thereby push bearing members 18 provided on the side portions 16 of the bending ring mold 4. A weight 19, which is slidably movable in the vertical direction, may be attached to each of the side pushing members 17 as shown in an enlarged schematic view of FIG. 4. By providing the weight 19, the pushing force of the side pushing member 17 can be adjusted as desired.

When the glass plate 6 is press-molded by the press mold 8, the temperature of the surface of the glass plates which are pressed by the press mold 8 should be carefully controlled. The optimum configuration of the shaped glass and optical characteristics for a laminated glass can be obtained when the surface temperature is in the range of 550° C.–650° C., preferably, 580° C.–620°

C. in the case of soda lime silica glass or a glass plate, e.g. a float plate glass. After completion of the descending operation of the press mold 8, the press mold 8 is maintained for a predetermined time whle the glass plate 6 is pressed. In this case, it is preferable that the time for pressing the glass plate 6 is 0 sec.–60 sec., more preferably, 0 sec.–30 sec. from the viewpoint of improvement of the configuration of the glass surface and the optical characteristics of the laminated glass.

After the pressing operation, the press mold 8 is ascended, and then, the bending ring mold device 4 carrying the glass plates 6 is transferred to the cooling zone 3 by means of a suitable transferring means 21 such as a transferring conveyor. In the cooling zone 3, the glass plates 6 are gradually cooled without causing undesired deformation or annealed, and the bending process according to the present invention is finished. Usually, the cooling of the glass plates 6 is carried out at a cooling speed of about 20° C./min.–200° C./min. However, a slightly faster cooling speed may be utilized when a band region having a greater compression stress is to be formed in the peripheral portion of the glass plates.

In accordance with the present invention, the glass plates 6 can be bent to have a variety of configuration by changing the shaping surface of the press mold 8.

In the following, preferred Examples of the present invention will be described.

EXAMPLE 1

Two sheets of float plate glass each having a thickness of 2 mm were put on the bending ring mold of a bending ring mold device. The bending ring mold device was transferred to a deadweight-bending zone where the glass plates are softened by application of heat so that they were bent by their deadweight so as to meet the shaping surface of the bending ring mold. Then, the bending ring mold device carrying the glass plates was transferred into a pressing zone where pressing operations were carried out at a pressing temperature of 603° C. and a descending speed of the pressing mold of 1.1 mm/sec. As soon as the pressing operations were finished, the bending ring mold device carrying the glass plates was transferred to a cooling zone. Thus obtained glass product had a height of 20.0 mm at the central part of the convex surface of the curved glass and had a three-dimensional curved surface. There was found no distortion in the optical characteristics of the laminated glass consisting of the two glass plates and evaluation was excellent. (The distortion is easily found in the laminated glass bent by its deadweight in the conventional method)

EXAMPLE 2

Two sheets of float plate glass having a thickness of 2 mm were put on the bending ring mold of a bending ring mold device. The bending ring mold device carrying the two glass plates was transferred in a deadweight-bending zone, where the glass plates were softened by application of heat so that they were bent by their deadweight so as to meet the shaping surface of the bending ring mold. Then, the bending ring mold device carrying the glass plates was transferred into a pressing zone, where pressing operations were carried out at a pressing temperature of 590° C. and a descending speed of the press mold of 1.1 mm/sec. Pressing of the glass plates was maintained for 10 seconds, and then, the glass plates were transferred into a cooling zone. Thus obtained glass product has a height of 14.5 mm at the central portion of the convex glass surface and has a three-dimensional curved surface.

There was found no distortion in the optical characteristics of the laminated glass consisting of the two glass plates and evaluation was excellent.

EXAMPLE 3

Two sheets of float plate glass having a thickness of 2.3 mm were put on the bending ring mold of a bending ring mold device. The bending ring mold device carrying the two glass plates was transferred into a deadweight-bending zone, where the glass plates were softened by application of heat so that they were bent by their deadweight so as to meet the shaping surface of the bending ring mold. Then, the glass plates were transferred into a pressing zone and pressing operations were carried out at a pressing temperature of 593° C. and a descending speed of the press mold of 0.4 mm/sec. As soon as the pressing operations were finished, the glass plates were transferred to a cooling zone. Thus obtained glass product has a height of 14.3 mm at the central portion of the convex surface and has a spherical surface configuration.

There was found no distortion in the optical characteristics of the laminated glass consisting of two glass plates, and evaluation was excellent.

As described above, in accordance with the present invention, a laminated glass plate having a three-dimensional curved surface can be obtained at a temperature of 630° C. or lower without necessity of elevating temperature at the surface of the glass plate at 630° C. or higher as in the conventional method which may cause an optical distortion, undesirable deformation and error in shaped product of the glass plate. Accordingly, a laminted glass having excellent optical property can be obtained even after pressing operations.

Further, in accordance with the present invention, the glass plate having a relatively complicated three-dimensional configuration can be obtained easier (it was difficult in the conventional method to form a glass plate having a three-dimensional curved surface by only means of deadweight-bending under application of heat).

Since it is unnecessary to heat the glass plates at a relatively higher temperature of 670° C.–700° C. when the glass plates are bent by their deadweight, any trace of the bending ring mold at the peripheral portion of the glass plates can be eliminated.

In accordance with a preferred embodiment of the present invention, the peripheral portion of the press mold does not contact with the peripheral portion of the glass plate which is in contact with the bending ring mold when the pressing operation is carried out. Accordingly, any trace of the bending ring mold on the peripheral portion of the glass plate can be avoided.

When a ceramic color coating is applied by printing on the peripheral portion of the glass plate, the trace of the press mold on the colored printing layer can be avoided since the peripheral portion of the press mold does not come to contact with the peripheral portion of the glass plate.

Obviously, numerous modifications and variations of the present invention are possible in light of the above teachings. It is therefore to be understood that within the scope of the appended claims, the invention may be practiced otherwise than as specifically described herein.

What is claimed is:

1. A method for bending glass plates which comprises:

a step of softening by heating at least, one glass plate on a bending ring mold to shape said at least one glass plate in a curved form by the deadweight thereof in a processing zone of a heating oven;

a step of pressing said at least one overlapped glass plate from the top, said at least one glass plate being bent in a predetermined form by the deadweight thereof on said bending ring mold, by a pressing mold in a pressing zone in said heating oven or in said pressing zone under heating condition which is connected to said heating oven, and a step of gradually cooling said at least, one glass plate in a cooling zone outside said heating oven, wherein said at least one glass plate, which is bent or being bent in a predetrmined form by the deadweight thereof on said bending ring mold is pressmolded by a pressing mold having a curvature in the shaping surface which is greater than a curvature in the shaping surface of said bending ring mold and a shaping surface which is smaller than said ring mold in such a manner that the peripheral portion of said pressing mold does not contact with a peripheral portion of said glass plate on said bending ring mold.

2. The method according to claim 1, wherein said at least one glass plate comprises at least two glass plates placed in an overlapping state.

* * * * *